United States Patent [19]

Watanabe et al.

[11] Patent Number: 5,502,098
[45] Date of Patent: Mar. 26, 1996

[54] POLYMER COMPOSITION FOR ELECTRICAL PART MATERIAL

[75] Inventors: Fumie Watanabe; Takashi Mizoguchi; Masatoshi Iwafune, all of Satte, Japan

[73] Assignees: Cosmo Research Institute; Cosmo Oil Co., Ltd., both of Tokyo, Japan

[21] Appl. No.: 266,382

[22] Filed: Jun. 27, 1994

[30] Foreign Application Priority Data

Jun. 28, 1993 [JP] Japan ................................ 5-185616
Jun. 28, 1993 [JP] Japan ................................ 5-185617

[51] Int. Cl.⁶ .......................... C08L 67/02; C08L 71/12; C08L 79/08
[52] U.S. Cl. .......................... 524/404; 524/405; 524/413; 524/427; 524/428; 524/430; 524/431; 524/433; 524/443; 524/508; 525/64; 525/66; 525/67; 525/68; 525/92 B; 525/133; 525/148; 525/166; 525/179; 525/180; 525/92 D; 525/92 E; 525/92 F
[58] Field of Search .................... 525/133, 166, 525/179, 180, 64, 66, 92 B; 524/405, 404, 413, 427, 428, 430, 431, 433, 443, 508

[56] References Cited

U.S. PATENT DOCUMENTS

| | | | |
|---|---|---|---|
| 4,840,995 | 6/1989 | Tamura | 525/133 |
| 4,855,356 | 8/1989 | Holub | 525/66 |
| 4,970,256 | 11/1990 | Inoue | 525/133 |
| 4,987,188 | 1/1991 | Furno | 525/180 |
| 5,242,981 | 9/1993 | Izumi | 525/133 |
| 5,270,386 | 12/1993 | Laughner | 525/133 |
| 5,304,593 | 4/1994 | Nishio | 525/133 |
| 5,373,046 | 12/1994 | Okamura | 524/413 |

FOREIGN PATENT DOCUMENTS 0148774  7/1985  European Pat. Off. ............... 525/133

*Primary Examiner*—Patricia A. Short
*Attorney, Agent, or Firm*—Oblon, Spivak, McClelland, Maier & Neustadt

[57] ABSTRACT

A polymer composition for electrical part material comprising, (I) a polymer blend which comprises (A) at least one polymer selected from specific types of polyether imides and polyesters, and (B) at least one polymer selected from specific types of polyphenylene ethers, polyolefins, and polycarbonates, and (II) a copolymer of maleic anhydride and vinyl type compound or (II') an epoxy-modified styrene-type copolymer. The composition has excellent compatibility, heat resistance, mechanical characteristics, platability, moldability, and electric characteristics. It is an ideal material for use as an electrical part material due to its low dielectric constant and low dielectric dissipation factor at high frequency.

6 Claims, 3 Drawing Sheets

POLYMER COMPOSITION FOR ELECTRICAL PART MATERIAL

BACKGROUND OF THE INVENTION

1. Field of the Invention

The present invention relates to a polymer composition for electrical part material.

2. Description of Background Art

Along with development of high frequency-related technologies, there is a tendency that a wider frequency band is used for equipments for signal transmittance. Some equipments are designed to receive or transmit signals with a frequency in the range of several hundred megaheltz (MHz) to several hundred gigaheltz (GHz). Materials used in electrical equipments using high frequency, specifically, materials used for devices or parts, such as packages, wiring circuit board substrates, sockets, and connecters, as well as materials for connecting these devices or parts, must have excellent electrical characteristics, such as a low dielectric constant and a low dielectric dissipation factor. The electric loss also must be small.

Beside the excellent electrical characteristics, superior moldability and metal platability are also required for electrical insulation materials, particularly those using high frequency.

Polyether imide, polyester, polyimide, and the like are popular engineering plastics due to their high heat resistance, excellent electrical insulation, and superior mechanical properties. These are also widely used as electrical insulating materials such as IC substrates and printed wiring board substrates because of their excellent heat resistance and electrical insulation.

These condensed aromatic-type heat-resistant polymers, however, exhibit only limited performances as insulating materials for high-density, multi-layered, integrated circuits or high-speed, high-frequency circuits due to their comparatively high dielectric constant and dielectric dissipation factor.

On the other hand, polyphenylene ether, polyolefin, polycarbonate, aromatic polyvinyl compounds, and the like have a low dielectric constant, dielectric dissipation factor, and other excellent electrical properties, although these are inferior in the mechanical properties, and heat resistance.

A number of studies are being undertaken on the design of polymer blends for the purpose of obtaining materials exhibiting two or more excellent characteristics possessed by these different-types of polymers.

A serious problem in these polymer blends is incompatibility of the component polymers. A number of polymers are incompatible each other, which is a cause of inferiority of various characteristics, especially mechanical properties.

For increasing the compatibility between polyether imide and polyphenylene ether, each having excellent characteristics as mentioned above, Japanese Patent Laid-open (kokai) No. 32880/1993 proposes incorporation of an epoxy-modified aromatic vinyl resin to the polymer blends as a compatibilizer.

Although epoxy-modified aromatic vinyl resin used in the Japanese Patent Laid-open (kokai) No. 32880/1993 as the compatibilizer can promote interactions among polymers, this resin is inferior in the heat resistance by itself. If used in a large amount in a polymer blend comprising polyether imide and polyphenylene ether, it may impair excellent heat resistance inherently possessed by the former polymers.

In addition, because this compatibilizer has a lower crystalline or glass transition point than that of polyether imide and polyphenylene ether, the three-component polymer blend may result in unhomogeneous molded articles with a surface layer consisting of the compatibilizer, if it is used in a large amount.

This unhomogeneous property may a cause of decreased heat resistance, electrical characteristics, and mechanical characteristics, especially when the molded articles are prepared by repeated melting operations.

In the case of electrical insulation materials used for electrical parts, e.g., IC board substrates or printed circuit board substrates, etc., high thermal conductivity is desired for efficiently dissipating heat generated during the time when these are used, in addition to excellent characteristics such as heat resistance, mechanical characteristics, electrical insulation properties, dielectric properties, and moldability.

However, because polymers generally have only small thermal conductivity, improvements in the conductivity is difficult if components for the blend is limited to polymers. Thus, this prior art composition remains insufficient with respect to thermal conductivity.

An object of the present invention is therefore to solve the problem of the poor compatibility among polymers without causing the above-mentioned problem of unhomogeneity in the molded articles, and to provide a polymer composition for use as an electronic material suitable for use at a high frequency range, which exhibits not only excellent electrical insulation, dielectric properties, heat resistance, mechanical characteristics, and moldability, but also superb heat characteristics such as thermal conductivity, and yet capable of excellently molded even if the same may be repeatedly molded.

The present inventors have undertaken extensive studies in order to achieve this object, and found that a combination, at a specific proportion, of (I) a polymer blend which comprises (A) at least one polymer selected from specific types of polyether imides and polyesters, and (B) at least one polymer selected from specific types of polyphenylene ethers, polyolefins, and polycarbonates, and (II) a copolymer of maleic anhydride and vinyl type compound, and, optionally, (III) fillers and the like, can provide a composition (hereinafter referred to as the first composition) with excellent compatibility, heat resistance, mechanical characteristics, metal platability, and moldability, while exhibiting superior electrical characteristics, such as reflecting and passing properties, i.e., a small return loss and a small insertion loss.

The inventors have further found that (I) said polymer blend, if combined with a very small amount (0.1–1.0 parts by weight for 100 parts by weight) of (II') an epoxy-modified styrene-type copolymer, especially a grafted epoxy-modified styrene copolymer, and, optionally, (III) fillers and the like, can provide a composition (hereinafter referred to as the second composition) with the same excellent characteristics as the first composition. This finding was surprising in that there is no decrease in the compatibility even though the amount of the epoxy-modified styrene-type copolymer is very small, and also there is no problem of unhomogeneity even though the composition is repeatedly molded.

SUMMARY OF THE INVENTION

Accordingly, an object of the present invention is to provide a polymer composition for electrical part material which comprises, (I) a polymer blend which comprises, (A) at least one polymer selected from the group consisting of, (a) a polyether imide represented by the following formula (1),

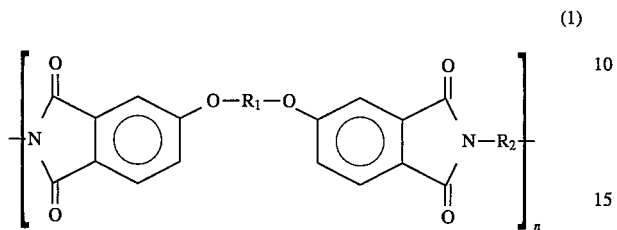
(1)

wherein n indicates an integer of 1–10,000, $R_1$ represents a

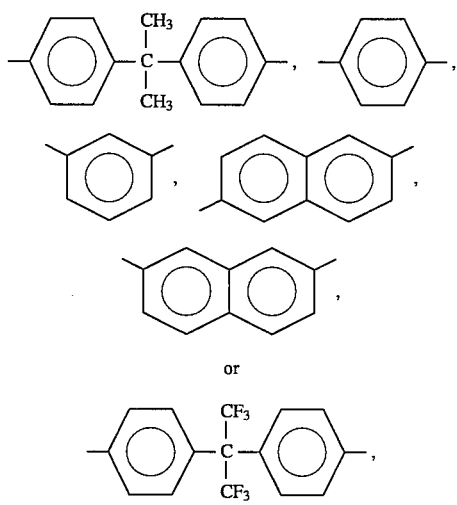

and
$R_2$ represents a group

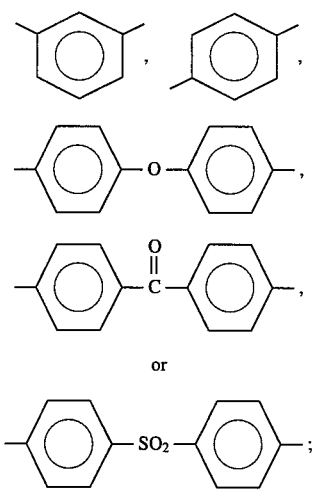

and (b) polyesters represented by the following formulas (2-1) to (2-11),

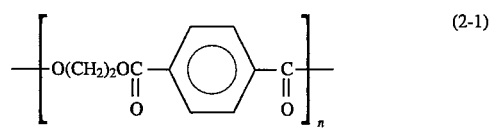
(2-1)

wherein n indicates an integer of 1–10,000,

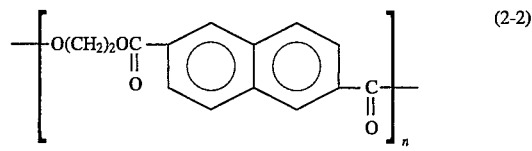
(2-2)

wherein n indicates an integer of 1–10,000,

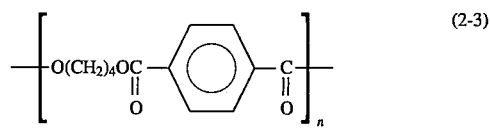
(2-3)

wherein n indicates an integer of 1–10,000,

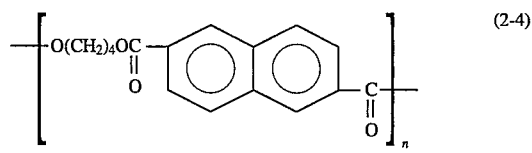
(2-4)

wherein n indicates an integer of 1–10,000,

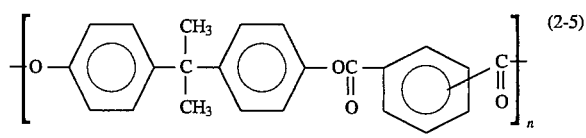
(2-5)

wherein n indicates an integer of 1–10,000,

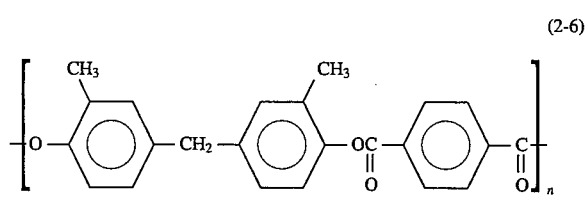
(2-6)

wherein n indicates an integer of 1–10,000,

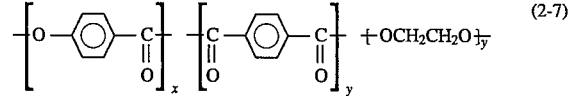
(2-7)

wherein x and y are integers satisfying an equation x+y=2 to 10,000,

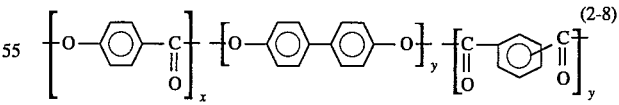
(2-8)

wherein x and y are integers satisfying an equation x+y=2 to 10,000,

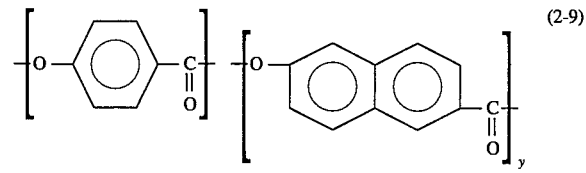
(2-9)

wherein x and y are integers satisfying an equation x+y=2 to 10,000,

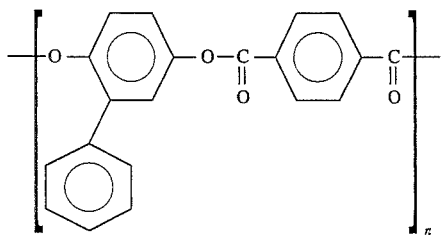
(2-10)

wherein n indicates an integer of 1–10,000, or

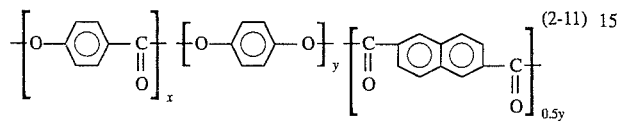
(2-11)

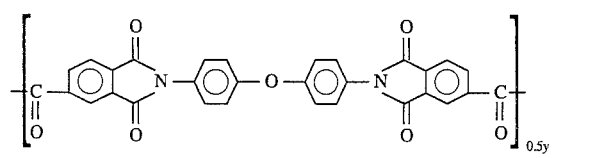

wherein x and y are integers satisfying an equation x+y=2 to 10,000, and (B) at least one polymer selected from the group consisting of, (c) polyphenylene ethers represented by the following formula (3),

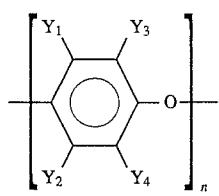
(3)

wherein n indicates an integer of 1–1000, $Y_1$, $Y_2$, $Y_3$, and $Y_4$ individually represent hydrogen or methyl group, (d) polyolefins represented by the following formula (4),

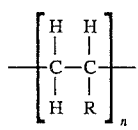
(4)

wherein R is an alkyl group having 1–10 carbon atoms, an aromatic group having 6–10 carbon atoms, or a hydrogen, an n is an integer of 1–100,000, and (e) polycarbonates represented by the following formulas (5-1) to (5-7),

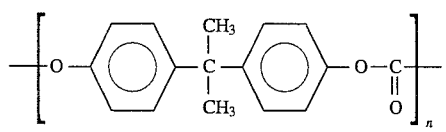
(5-1)

wherein n indicates an integer of 1–10,000,

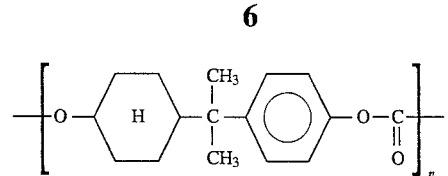
(5-2)

wherein n indicates an integer of 1–10,000,

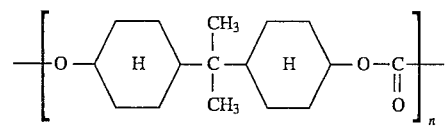
(5-3)

wherein n indicates an integer of 1–10,000,

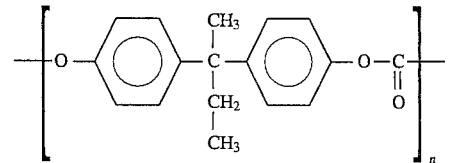
(5-4)

wherein n indicates an integer of 1–10,000,

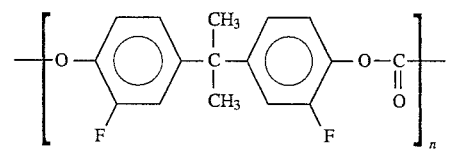
(5-5)

wherein n indicates an integer of 1–10,000,

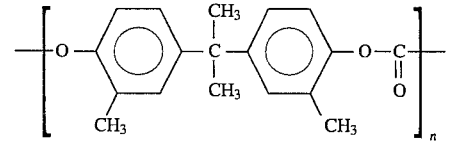
(5-6)

wherein n indicates an integer of 1–10,000, or

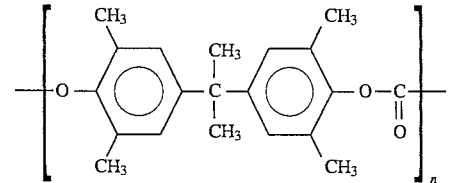
(5-7)

wherein n indicates an integer of 1–10,000; and (II) a copolymer of maleic anhydride compound and divinyl-type compound, wherein the amount of component (II) is 0.1 to 50 parts by weight for 100 parts by weight of said polymer blend Another object of the present invention is to provide a polymer composition for electrical part material which comprises, (I) the polymer blend defined above, and (II') an epoxy-modified styrene-type copolymer, wherein the amount of component (II') is 0.1 to 1.0 part by weight for 100 parts by weight of the total amount of said polymer blend (I).

Still another object of the present invention is to provide a polymer composition for electrical part material which comprises, (I) the polymer blend defined above, and (II) a copolymer of maleic anhydride compound and divinyl-type compound and (II') an epoxy-modified styrene-type copolymer, wherein the amount of components (II) and (II') is 0.1 to 50 parts by weight for 100 parts by weight of the total amount of said polymer blend (I).

Other and further objects, features and advantages of the present invention will appear more fully from the following description.

DETAILED DESCRIPTION OF THE INVENTION AND PREFERRED EMBODIMENTS

Figure 1A:
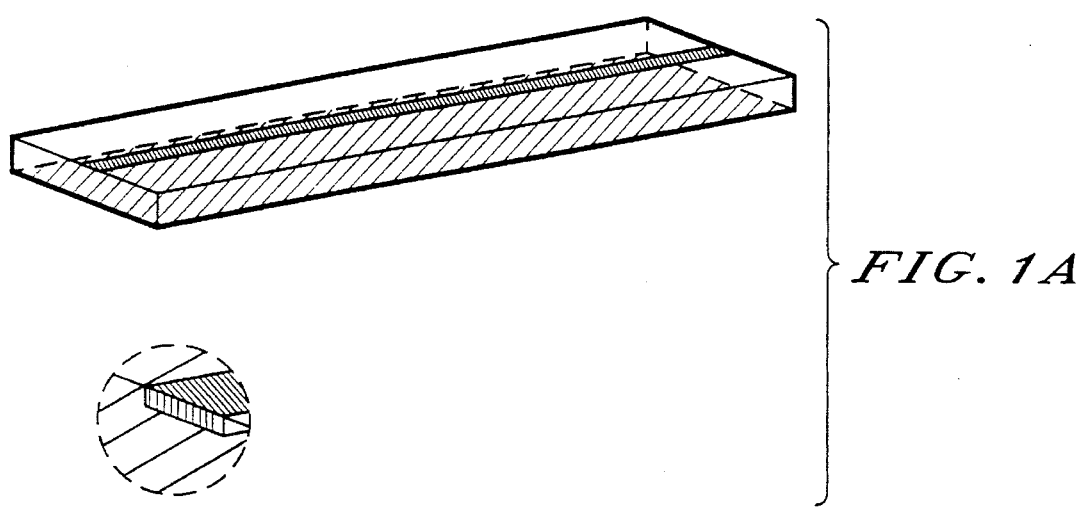
FIG. 1(A) is a drawing showing a test leaf used for the determination of return loss and insertion loss in the polymer composition of the present invention.
Figure 1B:
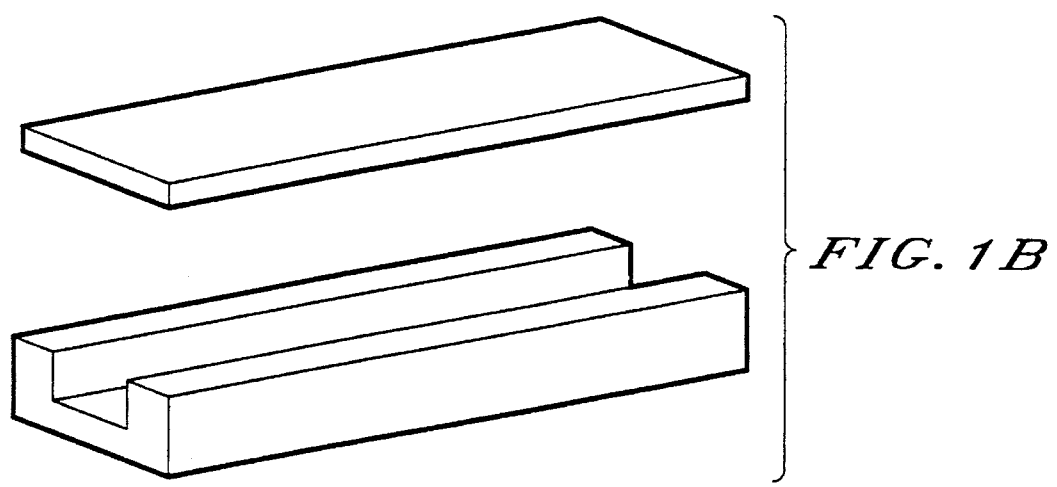
FIG. 1(B) shows a holder for an electromagnetic shielder.

Among the polyether imides, polyesters, polyphenylene ethers, polyolefins, and polycarbonates, the following compounds are especially preferred for use in the present invention, in view of the availability, costs, characteristics of the resulting composition, and the production process.

<Polyether imides>

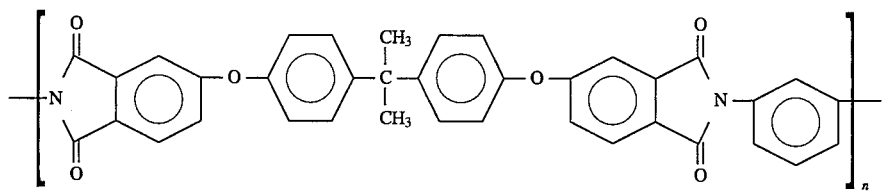

wherein n indicates an integer of 1–10,000.

<Polyesters>

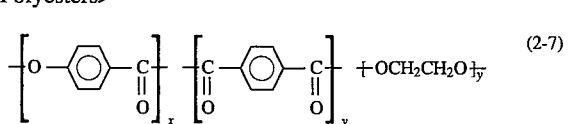
(2-7)

wherein x and y are integers satisfying an equation x+y=2 to 10,000,

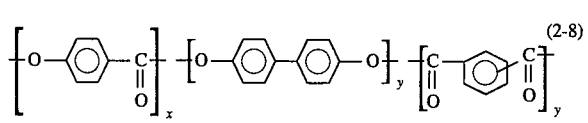
(2-8)

wherein x and y are integers satisfying an equation x+y=2 to 10,000,

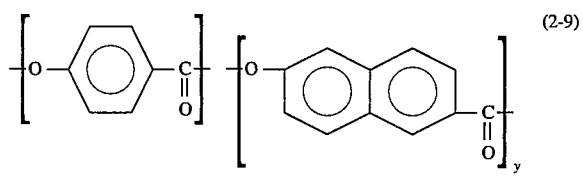
(2-9)

wherein x and y are integers satisfying an equation x+y=2 to 10,000,

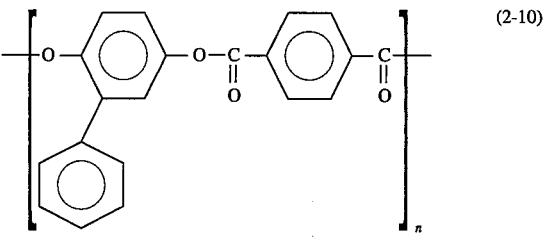
(2-10)

wherein n indicates an integer of 1–10,000, or

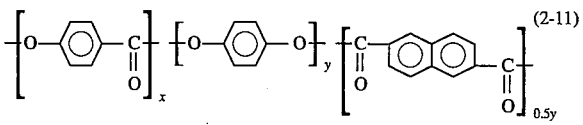
(2-11)

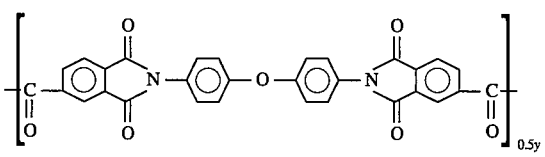

wherein x and y are integers satisfying an equation x+y=2 to 10,000, and

<Polyphenylene ethers>

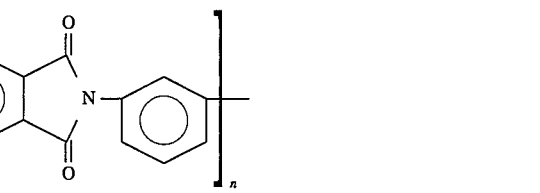
(3)

Polyphenylene ethers without modification or with a least degree of modification are preferred in view of high heat resistance. However, from the aspect of moldability and the like, those modified to a certain extent are preferred. Thus, the types of the polyphenylene ethers are suitably selected depending on the purpose of use.

<Polyolefins>

Polyethylene, polypropylene, poly-4-methyl-1-pentene, poly-1-butene, polybutadiene, polystyrene, syndiotactic polystyrene, poly-p-methylstyrene, poly-p-fluorostyrene, poly-p-chlorostyrene, poly-p-bromostyrene, and the like.

<polycarbonates>

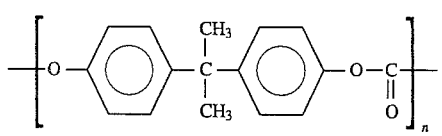

(5-1)

wherein n indicates an integer of 1–10,000.

(5-3)

wherein n indicates an integer of 1–10,000.

A preferable ratio by weight of polymers (A) and (B) in the polymer blend (I) in the composition of the present invention is (A):(B)=10:90 to 90:10, and more preferably 20:80 to 80:20. If the proportion of polymers (A) is small, the composition has decreased mechanical strength, heat resistance, and the like, but it has improved electrical characteristics such as a small dielectric constant and a small dielectric dissipation factor. If the amount of polymers (A) is large, the composition has increased mechanical strength, heat resistance, and the like, but the electrical characteristics are decreased, with higher dielectric constant and dielectric dissipation factor.

Because the characteristics of polymers (A) and polymers (B) are contradictory each other in this manner, it is possible to obtain a desired dielectric constant, mechanical strength, and the like by suitably adjusting the ratio of these two types of polymers within the above-defined range.

Examples of preferred combinations of polymers (A) and (B) summarized in the following table.

| Polymer (A) | Polymer (B) |
| --- | --- |
| Polyether imides + Polyester | Polyphenylene ether |
| Polyether imide | Polyphenylene ether |
| Polyether imide | Polycarbonate |
| Polyester | Polyphenylene ether |
| Polyester | Polycarbonate |

In the first composition of the present invention, the copolymer of maleic anhydride and vinyl type compound (II) is incorporated as a compatibilizer in an amount of 0.1–50 parts by weight, preferably 1–10 parts by weight, for 100 parts by weight of said polymer blend (I).

Copolymers of maleic anhydride and vinyl type compound which are preferable for use in the present invention in view of performances, costs, and the like include maleic anhydride-styrene copolymer, maleic anhydride-ethylene copolymer, maleic anhydride-propylene copolymer, maleic anhydride-methyl methacrylate copolymer, maleic anhydride-acrylonitrile copolymer, maleic anhydride-α-methylstyrene copolymer, maleic anhydride-p-methylstyrene copolymer, maleic anhydride-N-phenylmaleimide copolymer, and the like. Of these, maleic anhydride-styrene copolymer is particularly preferred. Either one of these may be used individually or two or more of them may be used in combination. These copolymers of maleic anhydride and vinyl type compound may be alternate copolymers, block copolymers, or random copolymers.

If the amount of the copolymer of maleic anhydride and vinyl type compound (II) is too small, sufficient compatibility cannot be achieved, resulting in the polymer composition with decreased mechanical strength. The compatibility among polymers is decreased also in the case where this amount of the copolymer of maleic anhydride and vinyl type compound (II) is too large. In this case, the heat stability of the resulting composition is also impaired. Thus, it is essential that the proportion of the copolymer of maleic anhydride and vinyl type compound (II) to the polymer blend (I) be within the range defined above.

In the second composition of the present invention, the epoxy-modified styrene-type copolymer (II') is incorporated as a compatibilizer in an amount of 0.1–1.0 parts by weight, preferably 0.2–0.8 parts by weight, for 100 parts by weight of said polymer blend (I).

Epoxy-modified styrene-type copolymers which are preferable for use in the present invention in view of performances, costs, and the like include epoxy-modified styrene-styrene copolymer, epoxy-modified styrene-methyl methacrylate copolymer, and the like. Either one of these may be used individually or two or more of them may be used together.

These epoxy-modified styrene-type copolymers may be graft copolymers, alternate copolymers, block copolymers, or random copolymers. Graft epoxy-modified styrene-type copolymers are particularly preferred, because graft copolymers enhance mutual actions among molecules, by which a three dimensional network structure between polymers (A) and polymers (B) is formed. Such a network structure not only prevents itself from being located as a layer on the surface of the molded articles, but also effectively increases the durability of the molded articles and makes it possible to be repeatedly molded.

If the amount of the epoxy-modified styrene-type copolymer (II') is smaller than 0.1 part by weight for 100 parts by weight of the polymer blend (I), the compatibility among the polymers is insufficient, resulting in poor mechanical strength of the resulting composition. If this amount is 1.0 parts by weight or larger, on the other hand, there is a problem of incapability of repeated molding of the polymer composition.

Compatibilizers (II) and (II') may be used in combination. In this instance, the amount of (II) plus (II') is 0.1–50 parts by weight for 100 parts by weight of the polymer blend (I). Taking the homogeneity of the resulting composition into consideration, the amount of compatibilizer (II') is preferably 0.1–1.0 part by weight.

A filler (III) may be optionally added to the polymer composition of the present invention. Incorporation of fillers can improve mechanical characteristics, heat properties, electrical characteristics, metal platability, and the like. Specific examples of fillers which can be used include inorganic fillers, such as glass, aluminum oxide, magnesium oxide, beryllium oxide, titanium oxide, aluminum nitride, silicon nitride, boron nitride, titanium nitride, silicon carbide, potassium titanate, aluminum borate, and calcium carbonate. Of these preferred are silicon carbide, silicon nitride, aluminum oxide, potassium titanate, glass, beryllium oxide, aluminum nitride, aluminum borate, and calcium carbonate. These fillers are used in an amount of 0.001 to 10 parts by weight, preferably 0.01 to 5 parts by weight, for 100 parts by weight of polymer blend (I) and compatibilizers (II) and/or (II').

Any types of fillers, such as whisker-type, fiber-type, spherical-type, and powder-type, can be used in the present invention. Whisker-type and mono-filament fiber-type fillers are particularly preferred in order to promote mechanical, heat, and other characteristics of the polymer composition. Silicon carbide, silicon nitride, aluminum oxide, potassium titanate, aluminum borate, aluminum nitride, or calcium carbonate whisker-type or mono-filament fillers are especially preferred.

In the case where whisker-type fillers are used, the length of whisker is about 5–50 μm, preferably about 20–40 μm, with a diameter of about 0.1–1.8 μm, preferably about 0.3–0.9 μm. If the length is too short and the diameter is too small, the performances exhibited by the whisker are insufficient; if the length is too long and the diameter is too large, the whisker shape may be destroyed when the filler is blended.

In the case where monofilament-type fillers are used, the length of the monofilament is about 2000–4000 μm, preferably about 2000–2600 μm, with a diameter of about 4–15 μm, preferably about 8–11 μm. If the length is too short and the diameter is too small, the mechanical strength of the resulting composition is impaired; if the length is too long and the diameter is too large, the other characteristics are inadequate.

Fillers treated with a silane coupling agent, such as γ-glycidoxypropyltrimethoxysilane, γ-aminopropyltriethoxysilane, or N-phenyl-γ-aminopropyltrimethoxysilane, may be also used.

Beside the above-described components (I), (II) and/or (II'), and (III), other components, such as heat stabilizers, flame retardants, coloring agents, and reinforcing agents, may be added to the polymer composition of the present invention.

The melt-blending method, the solution-blending method, or the like can be employed for preparing the polymer composition from above-described components.

The solution-blending method can be implemented at a low temperature without using complicated equipments, while it has disadvantages, such as requirement of a large amount of solvents, and complicated process steps. The melt-blending method, on the other hand, is superior because of the simple process. Because mass production requiring only a short period of time is possible without using any solvents, the melt-blending method is economical. Thus, in spite of the requirements of processing at high temperature using equipments such as an extruder, the melt-blending method is more preferred as the method of preparing the polymer composition of the present invention.

When the melt-blending method with heating is employed, the above-described components, i.e., polymers (A) and (B) for polymer blend (I), compatibilizers (II) and/or (II'), fillers (III), and other optional components, can be kneaded altogether, or these may be kneaded separately in any arbitrary order.

The filler may be kneaded together with polymers (A) and (B), or may be kneaded before or after polymers (A) and (B) are kneaded. Alternatively, it may be kneaded with a polymer blend composition obtained by first kneading a mixture of polymers (A) and (B), and compatibilizers (II) and/or (II').

A conventional kneader, mono-axial or bi-axial screw extruder, or the like, which possesses both heating and mixing functions, can be used as the equipment for blending these components.

Preferable blending conditions when a kneader is used, for example, are a kneader rotation of about 10–200 rpm, preferably about 30–100 rpm, a temperature of about 200°–400° C., preferably 250°–350° C., and a blending time of about 1–60 minutes, preferably 2–10 minutes. No good blends can be obtained at a rotation less than about 10 rpm or greater than about 200 rpm. A blending temperature below 200° C. cannot effectively melt polymers (A), while a temperature above about 400° C. may cause decomposition of components.

In the case where a biaxial screw extruder, for example, a unidirectional rotation screw extruder with the axial diameter of 40 mm and L/D of 33.5, is used, preferable blending conditions are a screw rotation of about 50–400 rpm, preferably about 100–300 rpm, and a temperature of about 200°–400° C., preferably 250°–350° C. No good blends can be obtained at a rotation less than about 50 rpm or greater than about 400 rpm. A blending temperature below 200° C. cannot effectively melt polymers (A), while a temperature above about 400° C. may cause decomposition of components.

With a period of time for the blending shorter than about one minute no sufficient blending can be achieved, while that exceeding 60 minutes does not bring about the blending effects proportionate to such a long time.

The polymer composition of the present invention thus obtained by kneading the required components can be molded into a suitable form, such as pellets, films, or the like, depending on the purpose to which the composition is directed.

According to the present invention, polymer components (A) and (B) which are not adequately compatible each other can exhibit excellent compatibility with the help of the copolymer of maleic anhydride and vinyl type compound (II) or the epoxy-modified styrene-type copolymer (II'), or both of these, used as a compatibilizer. In addition, if a filler is added to the composition, the interface of the filler and polymers exhibits excellent affinity and binding effects, assuring closely mixed conditions among these components, thus providing the polymer blend with superb mechanical properties.

In particular, in the case where the epoxy-modified styrene-type copolymer (II') is used as the compatibilizer in a very small amount, not only the compatibility among polymers is not reduced at all but also there are no problems of unhomogeneity, even when the composition is repeatedly molded.

Furthermore, the copolymer of maleic anhydride and vinyl type compound (II) and the epoxy-modified styrene-type copolymer (II'), so long as these are used in amounts within the defined range, do not impair the excellent heat resistance, moldability, electrical characteristics, mechanical characteristics, and the like inherently possessed by polymer components (A) and (B).

The mechanical characteristics and thermal conductivity of the polymers can be promoted even more by the addition of whisker-type or mono-filament-type inorganic fillers without sacrificing the heat resistance, moldability, and compatibility of the polymers, as well as the affinity or binding effects between the filler and the polymers.

Because of the excellent electrical characteristics, the polymer composition of the present invention is suitable as a material for electrical parts, particularly for molded interconnected devices, used in high frequency range. According to the test described in detail hereinafter, the polymer composition exhibits a return loss of 30.0 dB or smaller, preferably 25.0 dB or smaller, and more preferably 20.0 dB or smaller, and a insertion loss of 5.0 dB or smaller, preferably 3.0 dB or smaller, and more preferably 1.0 or smaller, in the frequency range of 950 MHz to 300 GHz, specifically 3–100 GHz, and more specifically 10–30 GHz.

The return loss and insertion loss in the present invention are determined by the following test method.

FIG. 1(A) shows a 50 mm×7 mm×1 mm, 50 Ω through test leaf used for the determination of return loss and insertion loss of the polymer composition. One side of the 50 mm×7 mm×1 mm test leaf is plated with metal all over the surface, while on the other side is fixed longitudinally all through the center of the 50 mm×7 mm rectangle a microstrip line, 1.86 mm wide, and 10 μm or thicker, with an impedance of 50 Ω.

The test leaf is enclosed in an electromagnetic shielding holder to exclude outside noise in the determination of return loss and insertion loss.

The return loss and insertion loss of the test leaf can be easily determined by measuring the S parameter. Because a signal line of the electric circuit in the high frequency is the microstrip line with an impedance of 50 Ω in this test leaf, the return loss and the insertion loss of the subject material are solely determined using this test leaf.

Usually, copper is plated on the surface. There are no differences in the results of the return loss and insertion loss measurements, if nickel or gold is plated instead of the copper. Therefore, plating not only with copper but also with nickel and gold is acceptable on the surface of the polymer composition of the present invention. Thus, surface treatments using conventional techniques such as dry plating and wet plating can be implemented over the surface of the polymer composition of the present invention.

The polymer composition for electrical parts material of the present invention is ideal for use in fabricating electronic equipments used in high frequency, specifically, materials used for devices, molded interconnected devices, or parts, such as printed circuit board substrates, packages, housing, sockets, antennas, coaxial connector, coaxial cables, and waveguides. Owing to the excellent moldability, it can be molded into electrical parts of any arbitrary shapes by injection molding, extrusion, or the like.

Other features of the invention will become apparent in the course of the following description of the exemplary embodiments which are given for illustration of the invention and are not intended to be limiting thereof.

EXAMPLES

Examples 1–17

Polymers and fillers at proportions listed in Tables 1–1 and 1–2 were preliminary blended in an omnimixer. The blends were continuously melt blended with heating using a biaxial extruder at 300° C. and 200 rpm to obtain polymer compositions.

The following materials and equipment were used in these tests.
Polyether imide:
Ultem 1010-1000 (trademark) manufactured by General Electric Co. (U.S.A).
Polyphenylene ether:
Zylone PXL 9102 (trademark) manufactured by Asahi Chemical Industry Co., Ltd.
Polyester:
Rodrun LC-5000 (trademark) manufactured by Unitika, Ltd.
Polycarbonate:
NOVAREX 7027A (trademark) manufactured by Mitsubishi Chemical Industries, Ltd.
Polyolefin:
Syndiotactic polystyrene (M.W. 72,000)
Biaxial extruder:
ZE40A (L/D=33.5) (trademark) manufactured by Berstorff A.G. (Germany).

The compositions were molded by injection molding into strips (127×12.7×3 mm), ASTM #1 dumbbells (3 mm), and discs (φ100×1.6 mm). For the preparation of the strips and ASTM #1 dumbbells, N40-BII (trademark) manufactured by Japan Steel Workers, Ltd. was used at a nozzle temperature of 340° C. The injection machine, Crockner F85 (trademark), manufactured by Crockner Co. was used at a nozzle temperature of 325° C. for the preparation of the discs.

For the evaluation of electrical characteristics (return loss and insertion loss) at high frequency (100 MHz to 26.5 GHz) the test leaves shown in FIG. 1(A) were prepared by the two-color injection molding at primary side cylinder temperature of 260° C., a mold temperature of 100° C., and injection pressure of 650 kgf/cm². After the surface treatment, rectangular leaves as shown in FIG. 1(A) were injected at secondary side cylinder temperature of 370° C., a mold temperature of 95° C., and injection pressure of 250 kgf/cm². The molded leaves were plated with non-electrolytic copper to obtain through test leaves with an impedance of 50 Ω.

The following test methods were applied in the determination various characteristics of the polymer compositions.

Figure 2:
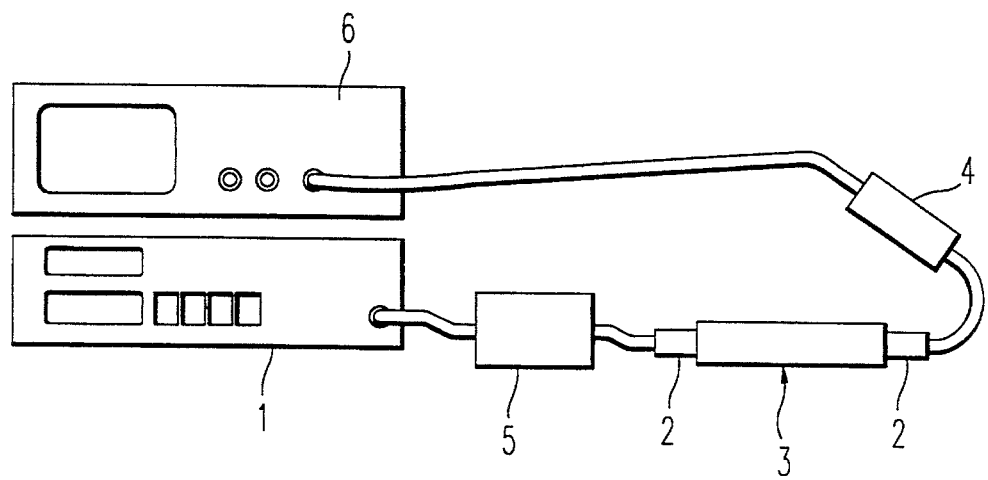
FIG. 2 is a drawing illustrating the overall construction of an electrical characteristic evaluation apparatus used for the determination of return loss and insertion loss, wherein numeral 1 indicates synthesized sweeper, 2 connector, 3 DUT (an object to be measured), 4 detector, 5 bridge circuit, and 6 scaranet work analyzer.

<Peel test>
The peel test was performed conforming to ASTM D638 using Instron 4302 as the tester at a pulling speed of 5 mm/minute, a bench mark distance of 115 mm, and at a temperature of 23° C. Five measurements were averaged to determine the tensile strength of the samples.
<Bending test>
The bending test was carried out conforming to ASTM D790 using Instron 4302 as the tester at a bending speed of 2 mm/minute, a supporting point distance of 50 mm, and at a temperature of 23° C. Five measurements were averaged to determine the flexural strength of the samples.
<Izod impact test>
The izod impact test was carried out conforming to ASTM D256 using an Izod impact tester manufactured by Toyo Seiki Co., Ltd. at a temperature of 23° C. <Dielectric constant (ε) and dielectric dissipation factor (tans δ) at 1 MHz and 10 MHz>
These were measured using an impedance/gain-phase analyzer HP-4194A (trademark) and dielectric measurement electrodes HP-16451B (trademark), both manufactured by Hewlett Packard Co., at a temperature of 25° C.
<Heat distortion temperature (HDT)>
HDT was measured by a method conforming to ASTM D648 using a heat distortion tester, S3-MH (trademark), manufactured by Toyo Seiki Co., Ltd. at a stress of 18.6 kgf/cm².
<Electrical characteristics at high frequency>
An equipment, of which the overall construction is shown in FIG. 2, was used. The return loss and insertion loss were measured by charging high frequency signals from synthesized sweeper 1 via bridge circuit 4 to DUT 3 (the object to be measured) fitted to connector 2, and receiving the response by a scalar network analyzer 6 via detector 5. As shown in the circuit block diagram in FIG. 3, the signals from millimetric wave sweep oscillator 11 enclosed in sweeper 1 are charged to DUT 3 fitted in between directional connecters 21 and 22 enclosed in connector 2, via frequency indicator 12, variable attenuator 13, and isolator 14.

Figure 3:
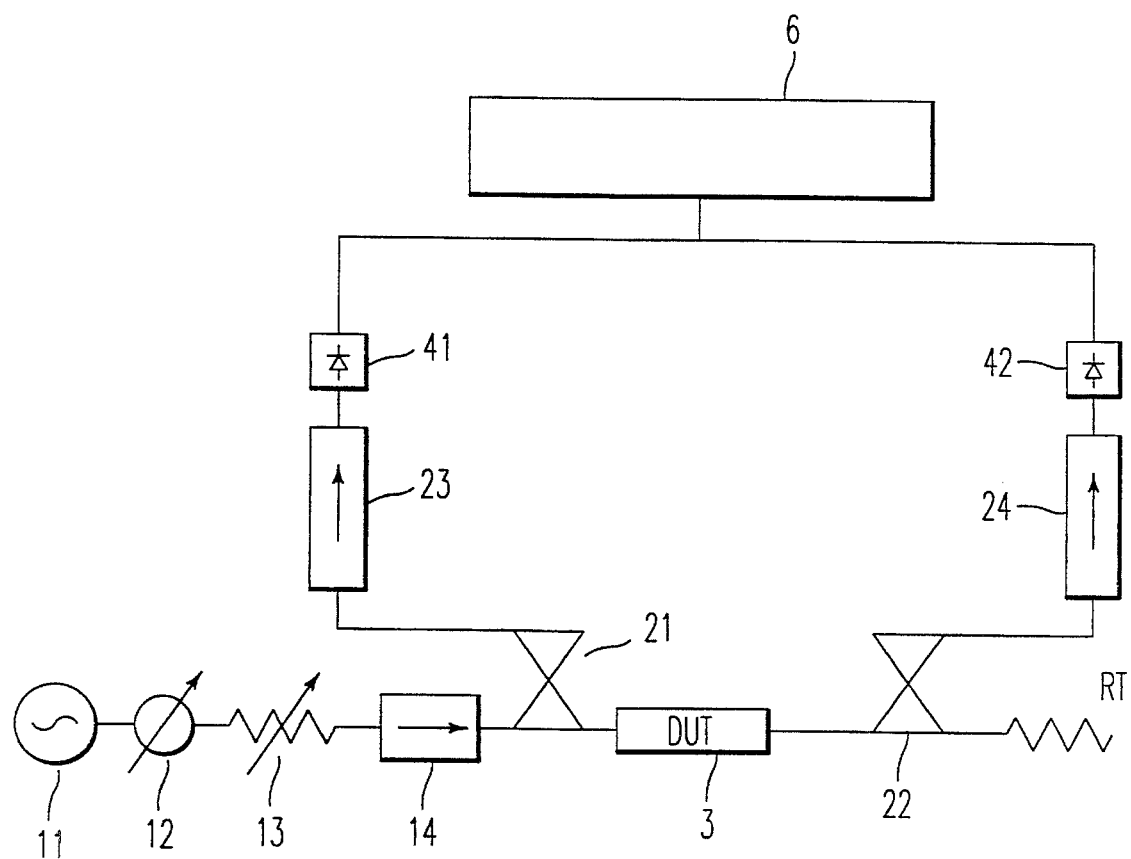
FIG. 3 is a block diagram of the circuit in the electrical characteristic evaluation apparatus of FIG. 2.

Among response signals from DUT 3, reflected waves are received by network analyzer 5 via directional connecters 21 enclosed in connector 2, isolator 23, and detector 41 (which corresponds to detector 4 in FIG. 2), and transmitted waves are received by network analyzer 5 via directional connecters 22 enclosed in connector 2, isolator 24, and detector 42 (which corresponds to detector 4 in FIG. 2). In FIG. 3, the DUT 3 terminal opposite to sweeper 1 ends at the resister RT.

Figure 4:
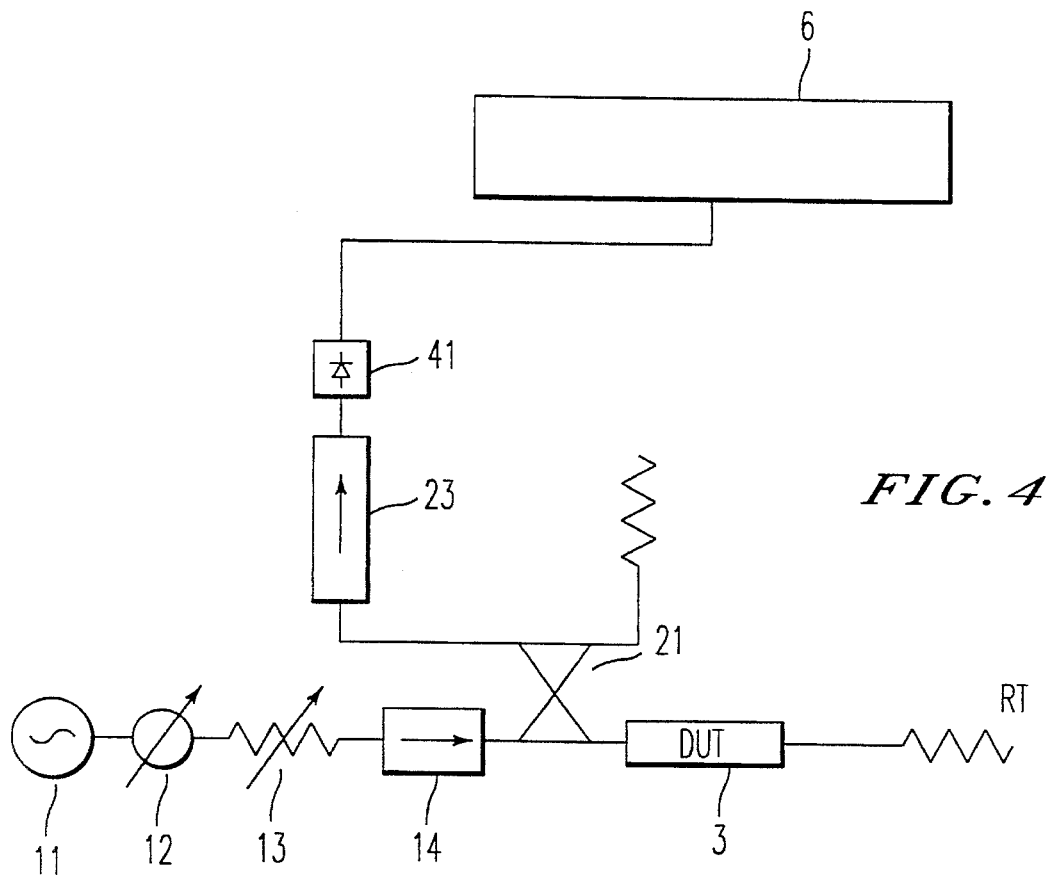
FIG. 4 is a portion of the circuit for measuring return loss and taken from the circuit of FIG. 3.

FIG. 4 is a portion of the circuit of FIG. 3 and shows a circuit for measuring reflection coefficient. As shown in this Figure, signals (incident wave) charged to DUT 3 and signals proportionate to response signals (reflection wave) are measured, and the reflection coefficient is determined from the ratio of the both measured values.

Figure 5:
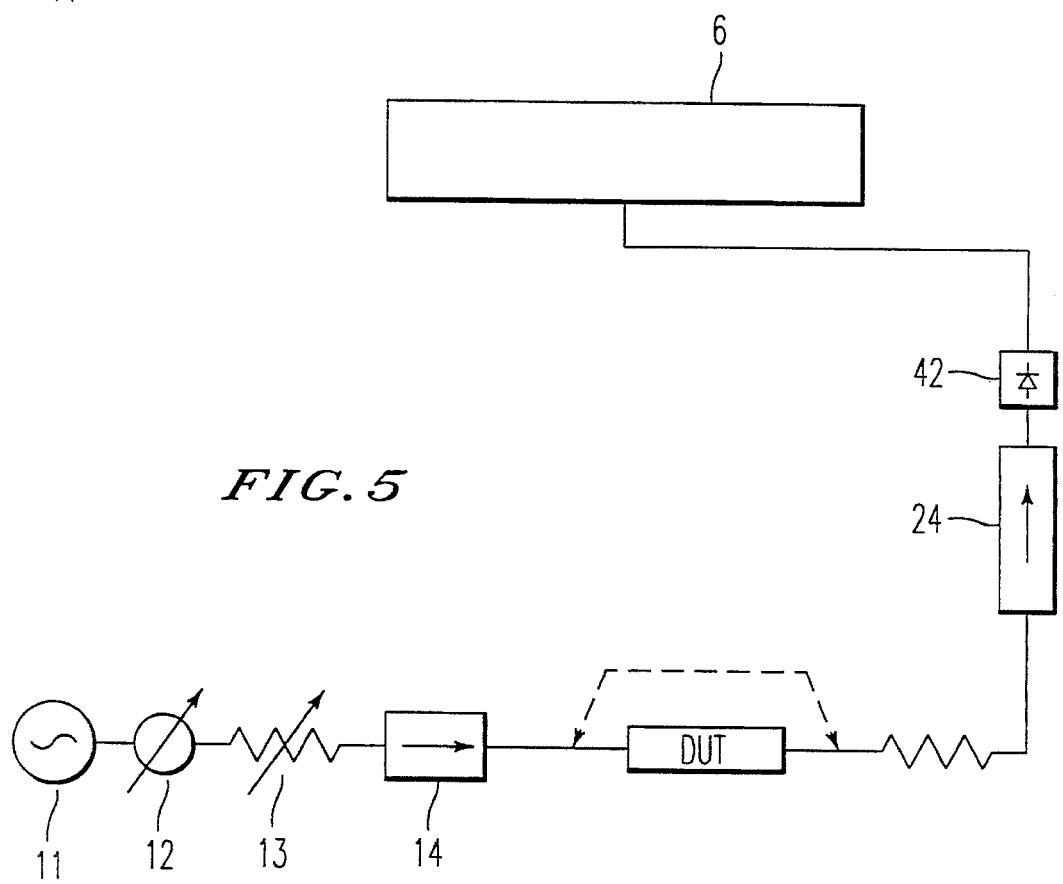
FIG. 5 is a portion of the circuit for measuring insertion loss and taken from the circuit of FIG. 3.

FIG. 5 is a portion of the circuit of FIG. 3 and shows the circuit for measuring transmission coefficient. As shown in FIG. 5, signals received by network analyzer 5 bypassing DUT 3 (which correspond to incident wave to DUT) and signals proportionate to response signals (transmission wave) are measured, and the transmission coefficient is determined from the ratio of the both measured values.

As the network analyzer, scalar network analyzer HP8757A (trademark) manufactured by Hewlett Packard Co. (U.S.A); as the synthesized sweeper, synthesized sweeper HP8341B (trademark) manufactured by Hewlett Packard Co. (U.S.A); as the detector, detector HP11664E (trademark) manufactured by Hewlett Packard Co. (U.S.A); and as the connecter, Whiltron connecter K (trademark) manufactured by Anritsu Co., Ltd., were respectively used.

The determination at 100 GHz was carried out on a test leaf with a size of 220×200×1 and the maximum surface roughness ($R^{max}$) of 0.05 μm using a semi-confocal type open resonator consisting of a spherical mirror and a plane mirror to which the test leaf is attached.

The results are shown in Tables 2-1 and 2-2.

The following standards were applied to the evaluation of various characteristics of the polymer compositions.

<Heat resistance>

| Heat distortion temperature under load | Heat resistance |
|---|---|
| 190° C. and higher | Good (AAA) |
| 180°–190° C. | Fair (BBB) |
| 18° C. and lower | Bad (CCC) |

<Platability>

The polymer composition was plated with copper and the plating closeness was evaluated by pressing an adhesion tape (12 mm wide cellophane adhesion tape defined in JIS Z 1522) with finger for about 10 seconds over the length of 50 mm or longer so as to leave no air bubbles in the interface, following which the tape was pulled vertically away from the plated surface to peel it off to examine if the plate membrane was raised or the plated metal was attached to the tape. Samples with neither raised plate membrane nor attachment to the plated metal to the tape were rated as good (AAA); those with partly raised plate membrane, as fair (BBB); and those with peeled plate membrane, as bad (CCC).

<Moldability (melt-flowability)>

The melt-flow length was taken as the standard of the moldability. The polymer composition was melted and injected using an injection mold at a cylinder temperature of 340° C. and a mold temperature of 150° C., and the length for which the melted polymer composition flowed was measured. An open mold die with a spool having a diameter of 1.5 mm and a 0.4 mm×2.0 mm side gate was used for the measurement. Samples with the melt-flow length longer than 25 mm were rated as good (AAA); those with the melt-flow length of 20–25 mm, as fair (BBB); and those with the melt-flow length shorter than 20 mm, as bad (CCC).

<Recycle moldability>

External appearance of (a) molded articles prepared simply kneading the polymer composition and (b) those prepared from these molded articles (a) by melting and remolding them was compared. Sample polymer compositions producing molded articles (b) having an external appearance equivalent to molded articles (a) were rated as good (AAA); those producing (b) having an external appearance slightly worse than (a), as fair (BBB); and those producing (b) having an external appearance worse than (a), as bad (CCC).

<Electrical characteristics>

Electrical characteristics of the compositions were evaluated according to the following standard.

| Return loss | Insertion loss | Evaluation |
|---|---|---|
| Less than 25.0 dB | Less than 3.0 dB | Good (AAA) |
| 25.0 to 30.0 dB | 3.0 to 5.0 dB | Fair (BBB) |
| Greater than 30.0 dB | Greater than 5.0 dB | Bad (CCC) |

The results of the evaluations are shown in Table 5.

TABLE 1-1

| | Example | | | | | | | | |
|---|---|---|---|---|---|---|---|---|---|
| | 1 | 2 | 3 | 4 | 5 | 6 | 7 | 8 | 9 |
| <Polymer component (I)> | | | | | | | | | |
| Polyether imide (PEI) | 50 | 50 | 50 | 50 | 50 | 70 | 30 | 50 | 50 |
| Polyester (LCP) | | | | | | | | | |
| Polyphenylene ether (PPE) | 50 | 50 | 50 | 50 | 50 | 30 | 70 | 50 | 50 |
| Polycarbonate (PC) | | | | | | | | | |
| Polyolefin | | | | | | | | | |
| <Compatibilizer (II) or (II')> | | | | | | | | | |
| Maleic anhydride-styrene copolymer (St-MAnh) | 5 | | | 5 | 5 | 5 | 5 | 5 | 5 |
| Epoxy-modified styrene-styrene copolymer (EpSt-St) | | 0.5 | 0.5 | | | | | | |
| Epoxy-modified styrene-methylmethacrylate copolymer (EpSt-MMA) | | | | | | | | | |
| <Inorganic filler (III)> | | | | | | | | | |
| Potassium titanate whisker | | | | 30 | 30 | | | | |
| Aluminum borate whisker | | | | | | 30 | 30 | 30 | 40 | 20 |

TABLE 1-2

| | Example | | | | | | | |
|---|---|---|---|---|---|---|---|---|
| | 10 | 11 | 12 | 13 | 14 | 15 | 16 | 17 |
| <Polymer component (I)> | | | | | | | | |
| Polyether imide (PEI) | 50 | 50 | | | | 50 | 42.5 | 42.5 |
| Polyester (LCP) | | | 50 | 70 | 50 | | 15 | 15 |

TABLE 1-2-continued

|  |  | Example |  |  |  |  |  |  |  |
|---|---|---|---|---|---|---|---|---|---|
|  |  | 10 | 11 | 12 | 13 | 14 | 15 | 16 | 17 |
| Polyphenylene ether (PPE) |  |  |  | 50 | 30 | 50 |  | 42.5 | 42.5 |
| Polycarbonate (PC) |  | 50 | 50 |  |  |  |  |  |  |
| Polyolefin |  |  |  |  |  |  | 50 |  |  |
| <Compatibilizer (II) or (II')> |  |  |  |  |  |  |  |  |  |
| Maleic anhydride-styrene copolymer (St-MAnh) |  |  |  | 5 | 5 | 5 | 5 | 5 | 5 |
| Epoxy-modified styrene-styrene copolymer-(EpSt-St) |  |  |  |  |  |  |  |  |  |
| Epoxy-modified styrene-methyl-methacrylate copolymer (EpSt-MMA) |  | 5 | 5 |  |  |  |  |  |  |
| <Inorganic filler (III)> |  |  |  |  |  |  |  |  |  |
| Potassium titanate whisker |  |  | 30 |  |  |  |  |  |  |
| Aluminum borate whisker |  |  |  |  |  | 20 | 30 |  | 30 |

TABLE 2-1

|  |  | Example |  |  |  |  |  |  |  |  |
|---|---|---|---|---|---|---|---|---|---|---|
|  |  | 1 | 2 | 3 | 4 | 5 | 6 | 7 | 8 | 9 |
| Tensile strength | kgf/cm² | 860 | 880 | 1150 | 1120 | 1180 | 1280 | 950 | 1250 | 1080 |
| Tensile modulus | kgf/cm² | 24000 | 25000 | 127000 | 130000 | 123000 | 135000 | 98000 | 129000 | 112000 |
| Flexural strength | kgf/cm² | 1250 | 1320 | 1400 | 1350 | 1320 | 1350 | 1050 | 1340 | 1110 |
| Flexural modulus | kgf/cm² | 27000 | 27000 | 100000 | 99000 | 105000 | 125000 | 87000 | 143000 | 102000 |
| Izod impact strength, notched | kgf/cm² | 5.0 | 4.0 | 2.1 | 1.9 | 2.8 | 2.9 | 2.8 | 2.0 | 3.1 |
| Dielectric constant ($\epsilon$) | (1 MHz, 25° C.) | 2.81 | 2.80 | 3.05 | 3.15 | 2.95 | 2.97 | 2.86 | 2.99 | 2.88 |
|  | (10 MHz, 25° C.) | 2.75 | 2.73 | 3.00 | 3.12 | 2.82 | 2.90 | 2.80 | 2.91 | 2.84 |
| Dielectric dissipation factor (tan $\delta$) | (1 MHz, 25° C.) | 0.0023 | 0.0025 | 0.0045 | 0.0051 | 0.0029 | 0.0039 | 0.0025 | 0.0032 | 0.0027 |
|  | (10 MHz, 25° C.) | 0.0035 | 0.0035 | 0.0059 | 0.0059 | 0.0033 | 0.0035 | 0.0030 | 0.0033 | 0.0031 |
| Return loss/-dB | (18 GHz, 25° C.) | 16 | 16.5 | 20.3 | 21.0 | 19.5 | 19.9 | 19.0 | 21.5 | 19.1 |
|  | (26 GHz, 25° C.) | 26.1 | 26.7 | 13.3 | 13.4 | 13.0 | 15.0 | 13.0 | 15.5 | 12.5 |
|  | (100 GHz, 25° C.) | 21 |  |  |  |  |  |  |  |  |
| Insertion loss/-dB | (18 GHz, 25° C.) | 3.0 | 3.2 | 1.7 | 1.8 | 1.9 | 2.5 | 1.8 | 2.3 | 1.9 |
|  | (26 GHz, 25° C.) | 4.5 | 4.9 | 2.9 | 2.9 | 2.7 | 2.6 | 2.5 | 3.0 | 2.6 |
|  | (100 GHz, 25° C.) | 2.3 |  |  |  |  |  |  |  |  |
| Heat distortion temperature | °C. @ 18.6 kgf/cm² | 176 | 180 | 186 | 183 | 191 | 202 | 180 | 198 | 181 |
| Coefficient of thermal conductivity | cal/cm · sec · °C. (× 10⁻⁴) | 5.0 | 5.0 | 9.0 | 8.7 | 8.9 | 8.4 | 8.0 | 9.8 | 6.9 |
| Coefficient of linear thermal expansion | ppm/°C. | 57 | 56 | 28 | 26 | 24 | 29 | 22 | 18 | 29 |

TABLE 2-2

|  |  | Example |  |  |  |  |  |  |  |
|---|---|---|---|---|---|---|---|---|---|
|  |  | 10 | 11 | 12 | 13 | 14 | 15 | 16 | 17 |
| Tensile strength | kgf/cm² | 850 | 1050 | 960 | 1050 | 1190 | 1290 | 960 | 1290 |
| Tensile modulus | kgf/cm² | 28000 | 85000 | 35000 | 42000 | 145000 | 138000 | 33000 | 142000 |
| Flexural strength | kgf/cm² | 1280 | 1340 | 1380 | 1450 | 1390 | 1450 | 1300 | 1400 |
| Flexural modulus | kgf/cm² | 28000 | 91000 | 39000 | 44000 | 162000 | 148000 | 38000 | 150000 |
| Izod impact strength, notched | kgf/cm² | 4.5 | 3.0 | 2.9 | 2.9 | 2.2 | 2.0 | 4.8 | 2.5 |
| Dielectric constant ($\epsilon$) | (1 MHz, 25° C.) | 2.80 | 2.98 | 3.01 | 3.10 | 3.05 | 2.90 | 2.85 | 2.87 |
|  | (10 MHz, 25° C.) | 2.75 | 2.88 | 2.90 | 2.93 | 2.85 | 2.84 | 2.83 | 2.85 |
| Dielectric dissipation factor (tan $\delta$) | (1 MHz, 25° C.) | 0.0038 | 0.0040 | 0.0041 | 0.0050 | 0.0043 | 0.0030 | 0.0025 | 0.0029 |
|  | (10 MHz, 25° C.) | 0.0039 | 0.0039 | 0.0047 | 0.0055 | 0.0045 | 0.0020 | 0.0031 | 0.0035 |
| Return loss/-dB | (18 GHz, 25° C.) | 16.9 | 21.3 | 19.5 | 23.5 | 21.0 | 21.5 | 18.8 | 19.5 |
|  | (26 GHz, 25° C.) | 28.1 | 15.2 | 18.8 | 20.0 | 20.1 | 20.8 | 19.5 | 20.1 |
| Insertion loss/-dB | (18 GHz, 25° C.) | 3.5 | 2.0 | 2.6 | 3.0 | 2.8 | 3.5 | 2.4 | 2.6 |
|  | (26 GHz, 25° C.) | 4.9 | 3.2 | 2.7 | 3.1 | 2.9 | 3.6 | 2.5 | 2.9 |
| Heat distortion temperature | °C., @ 18.6 kgf/cm² | 167 | 175 | 191 | 205 | 208 | 192 | 190 | 202 |
| Coefficient of thermal conductivity | cal/cm · sec · °C. (× 10⁻⁴) | 4.9 | 8.2 | 5.1 | 5.2 | 6.9 | 8.2 | 5.3 | 8.8 |
| Coefficient of linear thermal expansion | ppm/°C. | 52 | 28 | 58 | 57 | 29 | 22 | 56 | 23 |

Comparative Example 1-7

Polymer compositions were prepared in the same manner as in Examples 1-17 from polymers and fillers at proportions listed in Table 3.

Various characteristics of these compositions were measured and evaluated in the same manner as in Examples 1-17. The results are shown in Tables 4 and 5.

TABLE 3

|  | Comparative Example | | | | | | |
|---|---|---|---|---|---|---|---|
|  | 1 | 2 | 3 | 4 | 5 | 6 | 7 |
| <Polymer component (I)> | | | | | | | |
| Polyether imide (PEI) | 100 | | | | 50 | 50 | 50 |
| Polyester (LCP) | | 100 | | | 50 | | |
| Polyphenylene ether (PPE) | | | 100 | | | 50 | 50 |
| Teflon | | | | 100 | | | |

TABLE 3-continued

|  | Comparative Example | | | | | | |
|---|---|---|---|---|---|---|---|
|  | 1 | 2 | 3 | 4 | 5 | 6 | 7 |
| <Compatibilizer (II) or (II')> | | | | | | | |
| Maleic anhydride-styrene copolymer (St-MAnh) | | | | | | | |
| Epoxy-modified styrene-styrene copolymer (EpSt-St) | | | | | | 10 | 5 |
| Epoxy-modified styrene-MMA copolymer (EpSt-MMA) | | | | | | | |
| <Inorganic filler (III)> | | | | | | | |
| Potassium titanate whisker | | | | | | | |
| Aluminum borate whisker | | | | | | | |

TABLE 4

| | | Comparative Example | | | | | | |
|---|---|---|---|---|---|---|---|---|
| | | 1 | 2 | 3 | 4 | 5 | 6 | 7 |
| Tensile strength | kgf/cm$^2$ | 1100 | 1800 | 400 | 690 | 2000 | 850 | 865 |
| Tensile modulus | kgf/cm$^2$ | 19000 | — | — | 12000 | 25000 | 21000 | 21000 |
| Flexural strength | kgf/cm$^2$ | 1400 | 1400 | — | 1030 | 1490 | 1200 | 1240 |
| Flexural modulus | kgf/cm$^2$ | 30000 | 100000 | 3500 | 23000 | 32000 | 24000 | 24000 |
| Izod impact strength, notched | kgf/cm$^2$ | 2.5 | 23 | 16 | 6.9 | 2.3 | 4.5 | 4.2 |
| Dielectric constant ($\epsilon$) | (1 MHz, 25° C.) | 3.25 | 3.40 | 2.10 | 2.57 | 3.51 | 2.77 | 2.79 |
| | (10 MHz, 25° C.) | 3.18 | 3.40 | 2.10 | 2.51 | 3.40 | 2.75 | 2.79 |
| Dielectric dissipation factor (tan $\delta$) | (1 MHz, 25° C.) | 0.0051 | 0.040 | 0.0001 | 0.0003 | 0.008 | 0.0020 | 0.0023 |
| | (10 MHz, 25° C.) | 0.0065 | 0.041 | 0.0002 | 0.0005 | 0.009 | 0.0030 | 0.0030 |
| Return loss/–db | (18 GHz, 25° C.) | 30.5 | 35.0 | 24.8 | 25.5 | 32.5 | 17.8 | 17.9 |
| | (26 GHz, 25° C.) | 31.3 | 38.2 | 20.4 | 22.0 | 33.0 | 25.0 | 27.2 |
| Insertion loss/–db | (18 GHz, 25° C.) | 7.8 | 8.5 | 0.99 | 30 | 8.2 | 3.3 | 3.9 |
| | (26 GHz, 25° C.) | 7.9 | 8.8 | 1.6 | 3.8 | 8.5 | 3.9 | 4.0 |
| Heat distortion temperature | °C., @ 18.6 kgf/cm$^2$ | 190 | 170 | 51 | 153 | 190 | 171 | 173 |
| Coefficient of thermal conductivity | cal/cm · sec · °C. (×10$^{-4}$) | 4.9 | 5.3 | 4.2 | 4.9 | 5.0 | 5.0 | 5.1 |
| Coefficient of linear thermal expansion | ppm/°C. | 54 | 56 | 79 | 57 | 54 | 51 | 57 |

TABLE 5

| Example | Heat resistance | Metal Platability | Moldability | Recycle Moldability | Electrical characteristics |
|---|---|---|---|---|---|
| 1 | BBB | AAA | AAA | AAA | BBB |
| 2 | BBB | AAA | AAA | AAA | BBB |
| 3 | AAA | AAA | BBB | BBB | AAA |
| 4 | AAA | AAA | BBB | BBB | AAA |
| 5 | AAA | AAA | BBB | AAA | AAA |
| 6 | AAA | AAA | BBB | AAA | AAA |
| 7 | AAA | BBB | BBB | AAA | AAA |
| 8 | AAA | BBB | BBB | BBB | AAA |
| 9 | AAA | AAA | BBB | AAA | AAA |
| 10 | BBB | AAA | AAA | AAA | BBB |
| 11 | AAA | AAA | BBB | AAA | AAA |
| 12 | AAA | AAA | AAA | AAA | AAA |
| 13 | AAA | AAA | AAA | AAA | AAA |
| 14 | AAA | AAA | AAA | AAA | AAA |
| 15 | AAA | AAA | BBB | BBB | AAA |
| 16 | AAA | AAA | AAA | AAA | AAA |
| 17 | AAA | AAA | BBB | AAA | AAA |

TABLE 5-continued

| | Heat resistance | Metal Platability | Moldability | Recycle Moldability | Electrical characteristics |
|---|---|---|---|---|---|
| Comparative Example | | | | | |
| 1 | AAA | CCC | AAA | AAA | CCC |
| 2 | BBB | CCC | AAA | AAA | CCC |
| 3 | CCC | CCC | CCC | CCC | AAA |
| 4 | CCC | CCC | AAA | AAA | BBB |
| 5 | AAA | BBB | AAA | CCC | CCC |
| 6 | BBB | BBB | AAA | CCC | BBB |
| 7 | BBB | AAA | AAA | CCC | BBB |

All polymer compositions in the Examples exhibited remarkable lower return loss (less than 30 dB) and lower insertion loss (less than 5 dB) than polymer compositions in Comparative Examples, demonstrating their superior electrical characteristics. This applies to polymer compositions to which potassium titanate whisker or aluminum borate whisker was added as organic fillers (Examples 3 9, 11, 14, 15 and 17).

As can be seen in Comparative Examples 1 and 2, polyether imide and liquid crystalline polyester, which are known as engineering plastics possessing superior heat resistance, exhibited comparatively high dielectric constant. Their return loss and insertion loss at high frequency were also comparatively large. Teflon, which is a representative low dielectric constant polymer, exhibited unduly poor moldability and platability, even though its electrical characteristics are excellent (Comparative Example 3).

The polymer composition of Comparative Example 4 is insufficient in the heat resistance, although the moldability, electrical characteristics, and platability are acceptable.

The polymer composition of Comparative Example 5 is inferior in the electrical characteristics, although it is excellent in the heat resistance and mechanical characteristics.

The polymer compositions of Comparative Examples 6 and 7 have poor recycle moldability, even though they are excellent in the platability, heat resistance and electrical characteristics.

Based on the above results, the polymer composition of the present invention was proven to have excellent heat resistance, platability and moldability, and at the same time, to exhibit low dielectric constant and dielectric dissipation factor, showing small reflection and insertion losses at high frequency.

As illustrated above, the polymer composition for electrical material of the present invention exhibits only a small return loss of electric signals (less than 30 dB) and a small insertion loss of electric signals (less than 5.0 dB) over a wide high-frequency range (950 MHz to 300 GHz). This ensures selection of wiring circuit board substrates from a wide variety of materials. In addition, because the polymer composition of the present invention have excellent moldability, not only various circuit designs and package designs are possible using this polymer composition, but also the composition can be easily molded into a variety of parts devices, and molded interconnected devices, such as packages, connectors, printed circuit substrates, sockets, coaxial connectors, coaxial cables, and various housings.

Moreover, since the addition of fillers to the composition does not reduce these excellent characteristics, electrical parts with superb mechanical characteristics can be obtained.

Obviously, numerous modifications and variations of the present invention are possible in light of the above teachings. It is therefore to be understood that within the scope of the appended claims, the invention may be practiced otherwise than as specifically described herein.

What is claimed is:

1. A polymer composition for electrical part material which comprises, (I) a polymer blend which comprises, (A) (a) a polyether imide represented by the following formula (1),

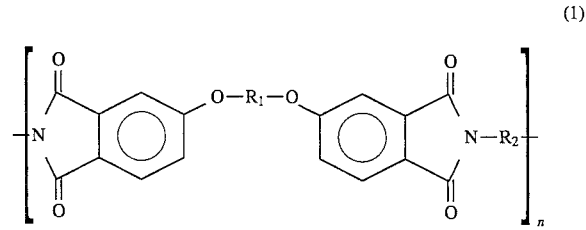

(1)

wherein n indicates an integer of 1–10,000, $R_1$ represents a

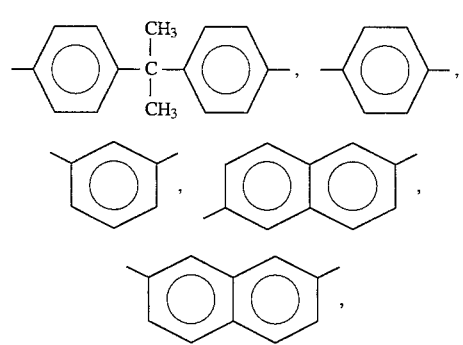

or

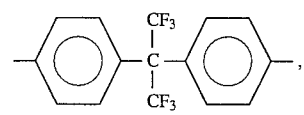

and $R_2$ represents a group

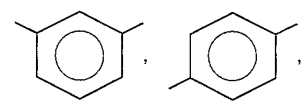

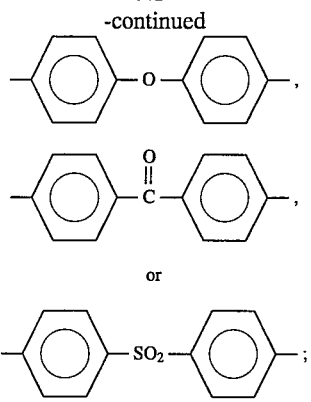

and (b) a polyester represented by the following formulas (2-1) to (2-11),

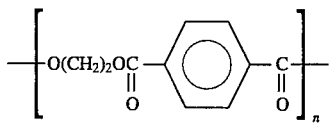
(2-1)

wherein n indicates an integer of 1–10,000,

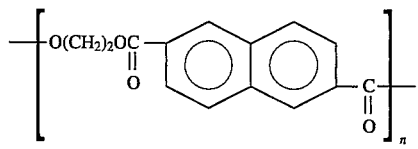
(2-2)

wherein n indicates an integer of 1–10,000,

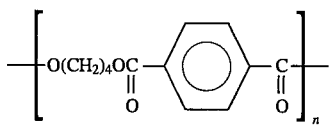
(2-3)

wherein n indicates an integer of 1–10,000,

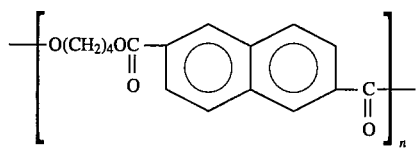
(2-4)

wherein n indicates an integer of 1–10,000,

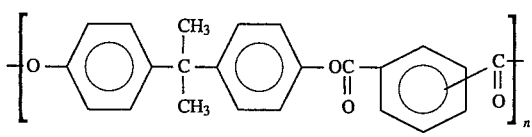
(2-5)

wherein n indicates an integer of 1–10,000,

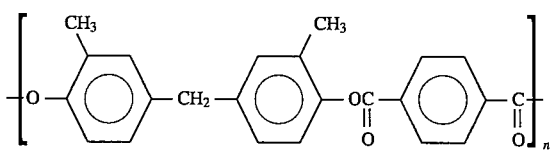
(2-6)

wherein n indicates an integer of 1–10,000,

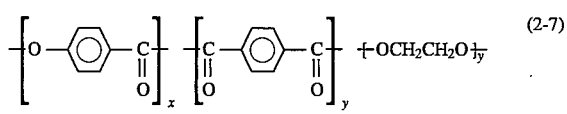
(2-7)

wherein x and y are integers satisfying an equation $x+y = 2$ to 10,000,

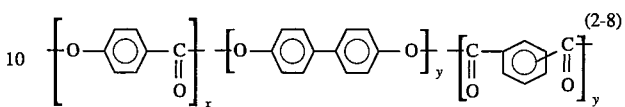
(2-8)

wherein x and y are integers satisfying an equation $x+y = 2$ to 10,000,

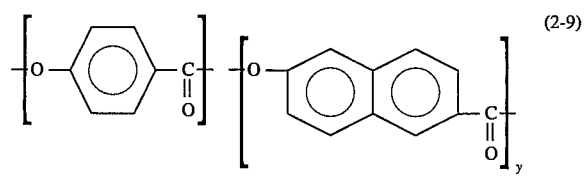
(2-9)

wherein x and y are integers satisfying an equation $x+y = 2$ to 10,000,

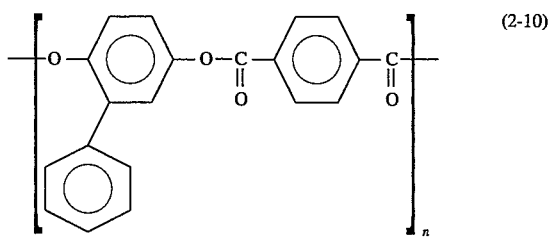
(2-10)

wherein n indicates an integer of 1–10,000, or

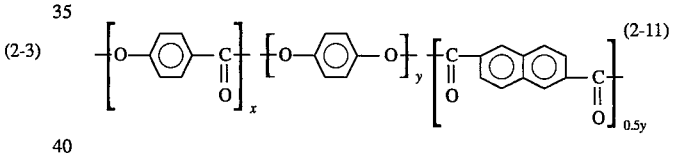
(2-11)

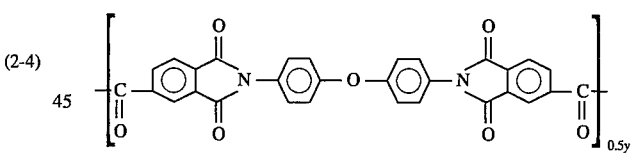

wherein x and y are integers satisfying an equation $x+y = 2$ to 10,000, and (B) polyphenylene ethers represented by the following formula (3),

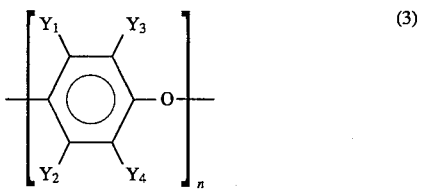
(3)

wherein n indicates an integer of 1–1000, $Y_1$, $Y_2$, $Y_3$, and $Y_4$ individually represent hydrogen or methyl group, (II) a copolymer of maleic anhydride and a vinyl compound, wherein the amount of component (II) is 0.1 to 50 parts by weight for 100 parts by weight of said polymer blend (I).

2. The polymer composition for electrical part material according to claim 1, wherein said copolymer of maleic anhydride compound and a vinyl compound is at least one compound selected from the group consisting of maleic anhydride-styrene copolymer, maleic anhydride-ethylene copolymer, maleic anhydride-propylene copolymer, maleic anhydride-methyl methacrylate copolymer, maleic anhydride-acrylonitrile copolymer, maleic anhydride-α-methylstyrene copolymer, maleic anhydride-p-methylstyrene copolymer, and maleic anhydride-N-phenylmaleimide copolymer.

3. The polymer composition for electrical part material according to claim 1, further comprising a filler.

4. The polymer composition for electrical part material according to claim 3, wherein said filler is at least one filler selected from the group consisting of glass, aluminum oxide, magnesium oxide, beryllium oxide, titanium oxide, aluminum nitride, silicon nitride, boron nitride, titanium nitride, silicon carbide, potassium titanate; alluminum borate, and calcium carbonate.

5. The polymer composition for electrical part material according to claim 3, wherein said filler is a whisker filler or a monofilament filler.

6. The polymer composition for electrical part material according to claim 1, having a return loss of 30.0 dB or smaller and a insertion loss of 5.0 dB or smaller in the frequency range of 950 MHz to 300 GHz, when measured on a 50 mm×7 mm rectangular test leaf, with a thickness of 1 mm, of which the one side is plated all over the surface and the other side has a microstrip line with an impedance of 50 Ω, 1.86 mm wide and at least 10 μm thick, affixed longitudinally all through the center of the 50 mm×7 mm rectangle.

* * * * *